No. 788,090. PATENTED APR. 25, 1905.
L. F. BRAINE.
TIRE.
APPLICATION FILED MAY 19, 1904.
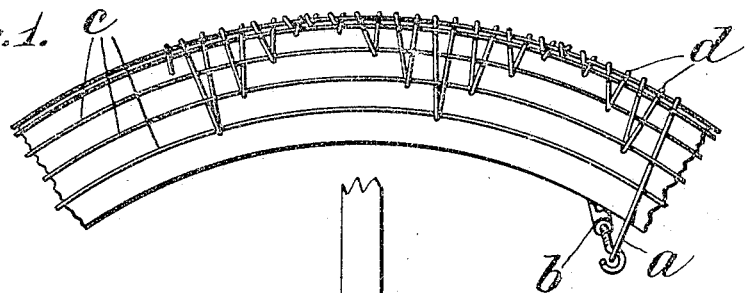
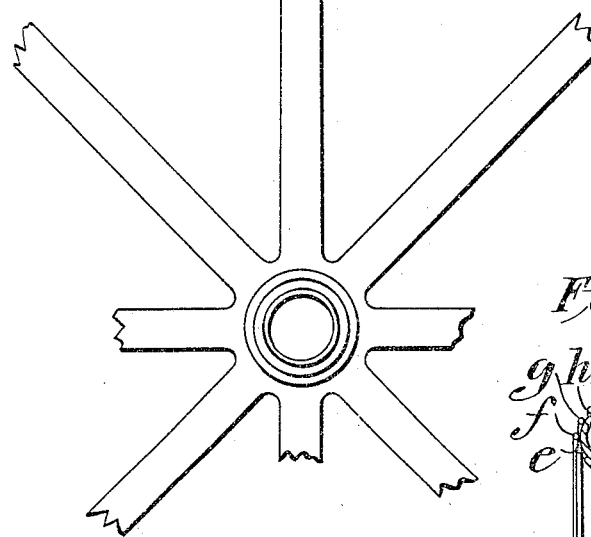
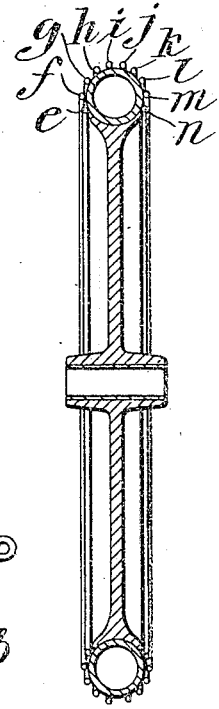
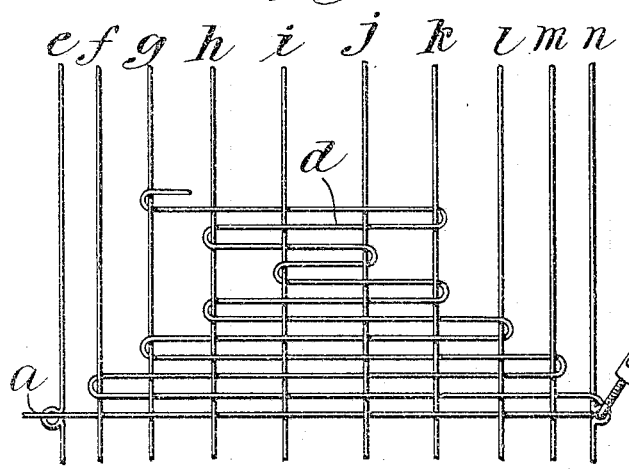
Witnesses
Lawrence F. Braine, Inventor
By his Attorneys No. 788,090.　　　　　　　　　　　　　　　　　　　　Patented April 25, 1905.

UNITED STATES PATENT OFFICE.

LAWRENCE F. BRAINE, OF NEWARK, NEW JERSEY.

TIRE.

SPECIFICATION forming part of Letters Patent No. 788,090, dated April 25, 1905.

Application filed May 19, 1904. Serial No. 208,655.

*To all whom it may concern:*

Be it known that I, LAWRENCE F. BRAINE, a citizen of the United States, residing in the city of Newark, county of Essex, in the State of New Jersey, have invented certain new and useful Improvements in Tires, of which the following is a specification, reference being had to the accompanying drawings, forming a part hereof.

It is the object of this invention to provide means for increasing the efficiency as well as the life of rubber tires for vehicles. Under the conditions of use which prevail to-day such tires are rapidly destroyed, owing to rough pavement, punctures from various causes, and the wear produced by other causes to which these unprotected soft-rubber tires are exposed. Furthermore, on smooth wet pavements the tires are constantly slipping, and the control of the machine is not only rendered imperfect, but the tractive force of the driving-wheels is materially lessened.

To overcome such objections and difficulties connected with the use of rubber tires, a particular form of tire-covering has been devised by me, which covering will now be described.

In the accompanying drawings, in which the invention is illustrated, Figure 1 is a view in side elevation of a sufficient portion of a wheel with the improved device secured to the rim thereof to enable the invention to be understood. Fig. 2 is a view in central section of the wheel on a smaller scale; and Fig. 3 is a diagrammatic view in projection of a portion of the improved tire-cover, illustrating the manner of weaving the same.

The improved cover is essentially a network or webbing which extends around the whole of the exposed part of the tire, as shown in the drawings. It may be secured to the wheel in various ways. As illustrated in Fig. 1, eyelets $a$ are provided in one edge of the cover and corresponding turnbuckles $b$ in the other edge thereof, the turnbuckles being brought through the eyelets over the inner side of the rim of the wheel when the cover is to be fastened thereto. It will be obvious, however, that the cover may be laced to the rim or that certain of the strands thereof may be extended so as to be tied or otherwise fastened around the rim, as desired.

The network comprising the cover is made up of circular longitudinal strands or rings $c$, preferably endless strands or rings, and a transverse strand or strands $d$, which are woven with the longitudinal strands to hold them together. The longitudinal strands are of different diameters, Fig. 2, according to their position in the cover, growing smaller as the strands approach the edge of the cover, so that the shape of the completed cover is that of a circular band bulging in the center—that is, the usual shape of the periphery of an ordinary tire. In order to weave this circular band of network or webbing in the form just specified and to bring the bulk of the material in the cross strand or strands near the center of the tire or cover where the greater wear will come, the following method of weaving is preferable: Assuming that the longitudinal strands $i$ and $j$, Fig. 3, are the central strands of the cover and that the longitudinal strands $e$ and $n$ are the strands at the edges of the cover, starting with a cross-strand $e$ at one edge, said cross-strand is brought under strand $f$, over strand $g$, under strand $h$, over strand $i$, under strand $j$, over strand $k$, under strand $l$, over strand $m$, around strand $n$; under strand $m$, over strand $l$, under strand $k$, over strand $j$, under strand $i$, over strand $h$, under strand $g$, around strand $f$; over strand $g$, under strand $h$, over strand $i$, under strand $j$, over strand $k$, under strand $l$, around strand $m$; over strand $l$, under strand $k$, over strand $j$, under strand $i$, over strand $h$, around strand $g$; under strand $h$, over strand $i$, under strand $j$, over strand $k$, around strand $l$; under strand $k$, over strand $j$, under strand $i$, around strand $h$; over strand $i$, under strand $j$, around strand $k$; over strand $j$, around strand $i$; around strand $j$; under strand $i$, around strand $h$; over strand $i$, under strand $j$, around strand $k$; over strand $j$, under strand $i$, over strand $h$, around strand $g$; under strand $h$, &c., until the transverse webbing reaches the outer edge of the tire. The same cycle is repeated and continued until a perfectly circular band has been woven. It will be understood that varying shapes of tires or wheels or other conditions may render different methods of weaving desirable or necessary. For instance, to have the cover fit closely against the tire it will be necessary always to have the varying diameters of the longitudinal strands on the rings correspond with the different diameters of the tire periphery. It will be understood, too, that one strand or several strands may be used to weave the longitudinal strands together.

The material of which the strands are composed may be any form of rope or the like and the proper size and thickness to suit the conditions of use for which it is desired. For light vehicles it will be obvious a smaller and probably a finer rope would be used than upon a large truck. The invention, however, is not limited to any particular material or to any particular dimensions of that material. In securing the cover about the tire the nature of the material of which the cover is composed should permit it to be stretched sufficiently to be slipped into position. It is then secured and tightened around the tire by the particular means which have to be prepared for the purpose. For pneumatic tires a cover slightly smaller than the inflated tire will be used, and it will be secured to the rim preferably when the tire is flat, whereupon the tire may be inflated to fill the space between the rim and the cover.

The advantages gained by the use of the cover will be clear. The tractive force of the driving-wheels will be considerably increased when wet pavements are encountered, particularly on account of the transverse strand or strands which are most numerous at the center of the wheel, the portion where most of the wear comes. The tire will be preserved from punctures, gouges, and other injuries which tend to destroy the same, inasmuch as the covering is tough and will have to be penetrated before the tire is encountered. Accordingly the tire will serve its purpose much more efficiently, and its life will be considerably prolonged.

I claim as my invention—

1. A tire-cover comprising a network having a plurality of longitudinal strands, and a transverse strand woven back and forth across the longitudinal strands so as to include a larger or smaller number of longitudinal strands each time it crosses the longitudinal strands.

2. A tire-cover comprising a network having a plurality of longitudinal strands, and a transverse strand woven back and forth across the longitudinal strands so as to include one less longitudinal strand toward the edge of the cover each time it crosses the longitudinal strands.

3. A tire-cover comprising a network having a plurality of longitudinal strands, and a transverse strand woven back and forth across the longitudinal strands under one and over the next so as to include one less longitudinal strand toward the edge of the cover each time it crosses the longitudinal strands.

This specification signed and witnessed this 16th day of May, A. D. 1904.

LAWRENCE F. BRAINE.

In presence of—
 ALFRED W. KIDDLE,
 LUCIUS E. VARNEY.